Dec. 8, 1931.  J. S. STONE  1,835,099

VALVE COMMUTATOR AND ITS USE IN MULTIPLEX SIGNALING

Filed Dec. 28, 1929   6 Sheets-Sheet 1

(3) Resultant across 101, 102
(2) Reactance component
(1) Resistance component

Fig. 3

Resistance of vacuum tube

Fig. 4

Impedance
($R_1$ in Fig. 1 represented by vacuum tube)

INVENTOR
John Stone Stone
BY
ATTORNEY

Dec. 8, 1931.  J. S. STONE  1,835,099

VALVE COMMUTATOR AND ITS USE IN MULTIPLEX SIGNALING

Filed Dec. 28, 1929   6 Sheets-Sheet 2

INVENTOR
John Stone Stone
BY
ATTORNEY

Dec. 8, 1931.  J. S. STONE  1,835,099
VALVE COMMUTATOR AND ITS USE IN MULTIPLEX SIGNALING
Filed Dec. 28, 1929  6 Sheets-Sheet 3

INVENTOR
*John Stone Stone*
BY
ATTORNEY

INVENTOR
John Stone Stone
BY
ATTORNEY

Dec. 8, 1931.  J. S. STONE  1,835,099
VALVE COMMUTATOR AND ITS USE IN MULTIPLEX SIGNALING
Filed Dec. 28, 1929  6 Sheets-Sheet 5

Fig. 26

$$c'L'\omega_0^2 = CL\omega_0^2 = 1$$

Fig. 27

$$C_0 L_0 \omega_0^2 = C'L'\omega_0^2 = CL\omega_0^2 = 1$$

INVENTOR
John Stone Stone
BY
ATTORNEY

Dec. 8, 1931.          J. S. STONE          1,835,099
VALVE COMMUTATOR AND ITS USE IN MULTIPLEX SIGNALING
Filed Dec. 28, 1929    6 Sheets-Sheet 6

INVENTOR
John Stone Stone
BY
ATTORNEY

Patented Dec. 8, 1931

1,835,099

UNITED STATES PATENT OFFICE

JOHN STONE STONE, OF SAN DIEGO, CALIFORNIA, ASSIGNOR TO AMERICAN TELEPHONE AND TELEGRAPH COMPANY, A CORPORATION OF NEW YORK

VALVE COMMUTATOR AND ITS USE IN MULTIPLEX SIGNALING

Application filed December 28, 1929. Serial No. 417,168.

An object of my invention is to provide a new and improved commutator for periodically changing the effective connections of electric circuits. Another object of my invention is to provide a commutator comprising a vacuum discharge tube in which the transmission of current is determined by the application of a superposed locally generated electromotive force. Another object of my invention is to provide for multiplex signaling by the aid of my improved commutators. These objects and other objects of my invention will become apparent on consideration of a limited number of specific embodiments of the invention which I have chosen to illustrate and describe in this specification. It will be understood that the following description relates to these particular examples of the practice of my invention and that the invention will be defined in the appended claims.

Referring to the drawings.

Figure 1:
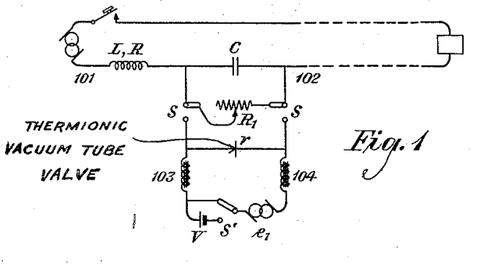
Figure 1 is a diagram showing a combination by means of which certain fundamental principles of the invention may be explained.

Between the points 101 and 102 of Fig. 1 is a network comprising a coil of resistance R and inductance L, and in series therewith a condenser of capacity C, and in shunt to the condenser a resistance $R_1$, which is adjustable or variable in value.

Let the resonant frequency of the coil and condenser be $w_o/2\pi$ so that $CLw_o^2=1$.

At the frequency $w_o/2\pi$, let the impedance of the network between 101, 102 in Fig. 1 be represented by Z and the component resistance by R′ and the component reactance by X′. Then the following relations are easily established:

$$R' = R + \frac{R_1}{1 + R_1^2/L^2 w_o^2} \quad (1)$$

$$X' = \frac{Lw_o}{1 + R_1^2/L^2 w_o^2} \quad (2)$$

$$Z = \sqrt{R'^2 + X'^2} \quad (3)$$

Figure 2:
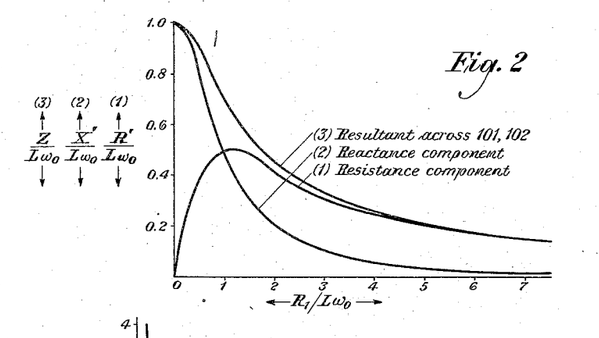
Fig. 2 is a diagram showing certain impedance components and their resultant for Fig. 1 as functions of the adjustable or variable resistance $R_1$.

These functional relations are exhibited respectively in the curves 1, 2 and 3 of Fig. 2, in which for convenience the axis of abscissæ is marked in units of value of $R_1/Lw_o$ and the axis of ordinates in units of $Lw_o$. Further, in the diagram of Fig. 2 the ratio $Lw_o/R$ is taken as 100.

As illustrated by curve 3 of Fig. 2 and as may be deduced from Equations 1, 2 and 3, when the shunt resistance $R_1$ takes the low value of $Lw_o/8$ the impedance of the network is 99.4% of its maximum impedance $Lw_o$, which is the value the network impedance attains when the resistance $R_1$ reaches zero value.

Figures 5, 5A:
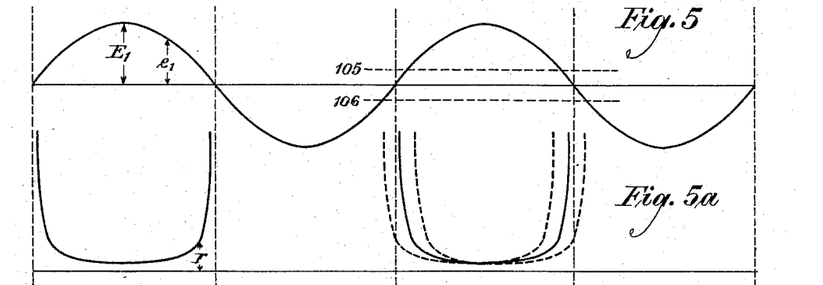
Figs. 5 and 5a are diagrams showing the resistance of the element $r$ of Fig. 1 as dependent on source $e_1$.

The symbol designated by $r$ in Fig. 1 represents a thermionic vacuum tube of two electrodes, a "valve" which passes current only one way. In such a device the current $i_1$ is related to the impressed voltage $e_1$ approximately according to the equation $i_1 = ae_1^2$, for positive values of $e_1$; for negative values of $e_1$ the current, $i_1$ is zero. Let the impressed voltage be sinusoidal so that $e_1 = E_1 \sin w_1 t$ where $E_1$ is the maximum voltage, as shown in Fig. 5; let this be fixed in value by the equation $\alpha E_1 = 8/Lw_o$.

For the purpose of the present discussion let the resistance of the two-electrode vacuum tube be defined as the ratio of the applied electromotive force to the current and let this resistance be represented by the character $r$; accordingly $r = e_1/i_1 = e_1/\alpha e_1^2 = 1/\alpha e_1$. (When the resistance is defined as the ratio of the increment of applied electromotive force to the increment of corresponding current, it results that $r' = de_1/di_1 = 1/2\alpha e_1$, showing that the definition here adopted gives a value having a constant relation to the value given by this other definition; that is the definition here adopted gives a value double that of the other definition.) From the definition here adopted and from the immediately foregoing equations, the diagram of Fig. 3 may be deduced, showing the resistance as a function of the argument angle according to the equation $$r = 1/\alpha e_1 = \frac{1}{\alpha E_1 \sin w_1 t} = \frac{Lw_o}{8 \sin w_1 t} \quad (3a)$$

Figure 3:
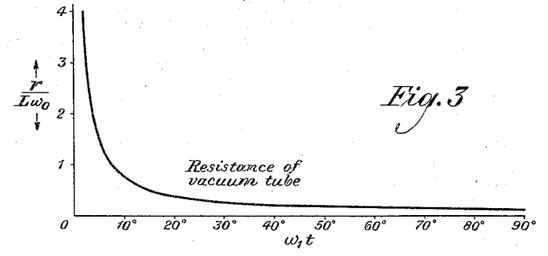
Fig. 3 is a diagram showing resistance as a function of a certain phase angle for an ordinary thermionic vacuum tube $r$ which may take the place of the resistance $R_1$ in Fig. 1.

From the curve of Fig. 3 it will readily be seen that the resistance of the valve remains less than $Lw_o$ when $w_1 t$ lies between 7° and 173° for each half cycle of impressed electromotive force. This is also shown in the full line curves of Fig. 5a.

Figure 4:
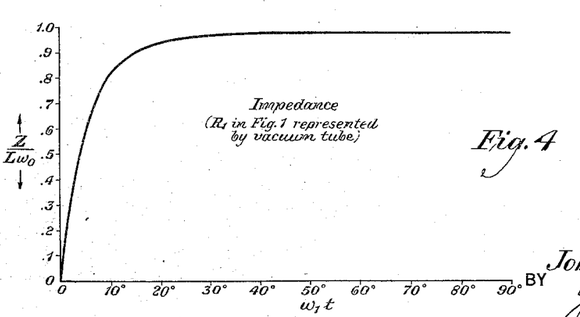
Fig. 4 is a diagram of impedance as a function of phase angle when the vacuum tube referred to takes the place of the resistance $R_1$, and an alternating electromotive force is applied as at $e_1$.

Now let the switches S in Fig. 1 be shifted, thus substituting the valve R and associated elements for the resistance $R_1$. From Figs. 2 and 3 and the corresponding equations, the impedance Z (at frequency $w_1/2\pi$) of the network of Fig. 1 may be obtained as a function of the phase angle for the source $e_1$. The result is the curve of Fig. 4; also see the full line curve of Fig. 12. These curves show the instantaneous values of the impedance Z of the network of Fig. 1 across 101, 102 as the resistance of the valve $r$ in shunt to the condenser C varies cyclically as shown in Fig. 5a, due to the varying electromotive force $E_1 \sin w_1 t$ of source $e_1$. It will be noted that the impedance of the network rises very rapidly from $w_1 t = 0$ to $w_1 t = 10°$ and that it remains practically constant from 20° to 160° over which range the impedance is substantially the value $Lw_o$.

It is to be understood that the assumed frequency $W_1/2\pi$ is extremely small compared to the frequency $w_o/2\pi$ of the resonant circuit L, C. For example, the former frequency may be taken at about 125 and the latter at 62,500 or more. Thus the steady state values of the apparent resistance $R'$, apparent reactance $X'$ and the impedance Z of the network are properly taken without danger of committing any appreciable error thereby.

Figure 12:
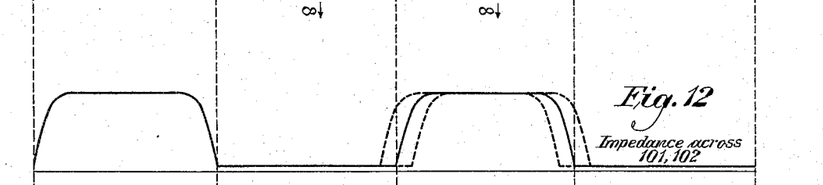
Figs. 12 and 13 are diagrams showing impedance and current for Fig. 1 as dependent on the source $e_1$.

The full line curve of Fig. 12 gives the impedance of the network of Fig. 1 to currents of frequency $w_o/2\pi$, over a range of two cycles of the varying shunt valve resistance $r$ as determined by the electromotive force $e_1$ of frequency $w_1/2\pi$.

Referring to Fig. 1, the amplitude $E_1$ of the source $e_1$ is assumed to be great compared to the amplitude $E_o$ of the force of frequency $w_o/2\pi$ applied to the terminals 101 and 102. The impedances 103, 104 as indicated in Fig. 1, are negligible for the electromotive force $e_1$ having the relatively low frequency $w_1/2\pi$, but they are high for the force applied to terminals 101, 102, which has the relatively high frequency $w_o/2\pi$.

Figure 13:
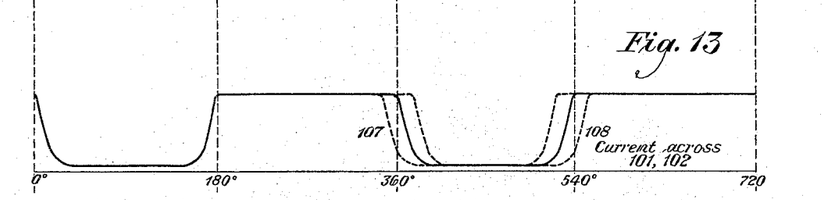

The mode of operation of the system 1 is shown by Figs. 12 and 13. From 0° to 180° the electromotive force from the source $e_1$ is applied to the valve $r$ in the direction to pass current, and over most of the range referred to the valve $r$ is caused to have a low resistance as shown in Fig. 5a. When the resistance of the valve $r$ is low, the impedance of the network across the terminals 101, 102 is high and this high impedance is shown by the full line curve of Fig. 12. This high impedance results in a low current value at the frequency $w_o/2\pi$ from 0° to 180° as shown in Fig. 13.

But when the electromotive force from the source $e_1$ is applied in the opposite direction, as is the case from 180° to 360°, the valve $r$ passes no current whatever, and its impedance is practically infinite. This virtual open circuiting of the shunt around the condenser C causes the impedance across the terminals 101, 102 at the resonant frequency $w_o/2\pi$ to become a minimum as shown in Fig. 12. Accordingly, the current across the points 101, 102 becomes a maximum from 180° to 360° as shown in Fig. 13.

It will often be desirable to employ the additional unidirectional electromotive force V in series with $e_1$, as by throwing the switch S' in Fig. 1. This will give a bias, having the effect to shift the axis of abscissæ up to 105 or down to 106 as indicated in dotted lines in Fig. 5. The resulting change in the resistance of the valve R is shown by the dotted lines in Fig. 5a and the change in the impedance and current across the points 101, 102 is shown by the dotted lines in Figs. 12 and 13. By giving a proper value to the electromotive force of V, the current curve of Fig. 13 can be adjusted to make the open and closed commutation periods approximately equal in duration as indicated by the dotted lines at 107 and 108.

Figures 6, 7, 8, 9:
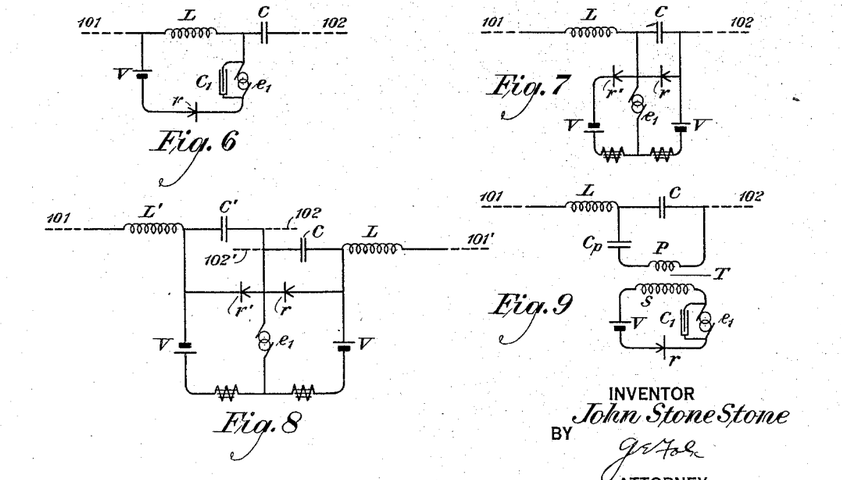
Figs. 6 to 11 are further diagrams extending the scope and application of the principles exhibited in connection with Figs. 1 to 5.

Fig. 6 shows a modification in which the inductance coil L is shunted by the valve $r$ and associated elements. With the arrangement shown in Fig. 6 the current across 101, 102 at the frequency for which L and C are resonant is passed or blocked according to the phase of the generator $e_1$. It will not be necessary to go into the theory in detail because it corresponds closely to the theory for Fig. 1.

Fig. 7 illustrates a modification corresponding to Fig. 1 in which two valves $r$ and $r'$ are used, the object being to equalize the load on the generator $e_1$ over both half cycles of its operation.

In the arrangement of Fig. 8 there are two inter-related networks, one between the pair of terminals 101 and 102, the other between 101' and 102'. The system of Fig. 1 is duplicated in Fig. 8 in such a way that when 101, 102 is "open", then 101', 102 is "closed", and vice versa.

The modification of Fig. 9 may be compared with that of Fig. 1. Fig. 9 is adapted for a case in which the reactance $Lw_o$ of the coil L needs to be of relatively low value because of low electromotive force across the points 101, 102. The high frequency transformer T is employed and the auxiliary condenser $C_p$ is introduced to reduce the apparent reactance of its primary P to zero. The apparent resistance across the terminals of the primary P of the transformer T is given by the equation $$r'_1 = r_1 + r_2 \frac{x_{12}^2}{r_2^2 + x_2^2} \quad (4)$$

and the apparent reactance is given by the equation $$x'_1 = x_1 - x_2 \frac{x_{12}^2}{r_2^2 + x_2^2} \quad (5)$$

where $r_1$ is the ohmic resistance of P, $r_2$ is the ohmic resistance of the secondary coil S, $x_1$ is the combined reactance of P and the condenser $C_p$, $x_2$ is the reactance of the secondary circuit of the transformer T, and $x_{12}$ is the mutual reactance of the transformer coils. The condition that $x'_1$ shall be zero is determined by equating this expression for $x'_1$ to zero and is $$x_{12}^2 = x_1 x_2 \left(1 + \frac{r_2^2}{x_2^2}\right) \quad (6)$$

This equation is satisfied by giving the proper value to the condenser $C_p$, whereupon the apparent resistance across the primary terminals of T becomes $$r'_1 = r_1 + \frac{x_1}{x_2} r_2 \quad (7)$$

Thus the value $r'_1$ is the apparent resistance in shunt to the condenser C of Fig. 9. It will be seen that by the use of the transformer T the apparent resistance in shunt to the condenser C is notably increased over the value $r$ as in Fig. 1.

Figure 10:
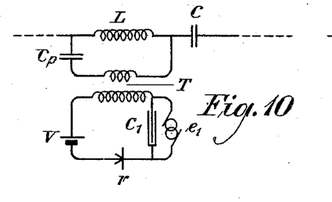

Fig. 10 bears a relation in Fig. 6 which is similar to the relation of Fig. 9 to Fig. 1.

Figure 11:
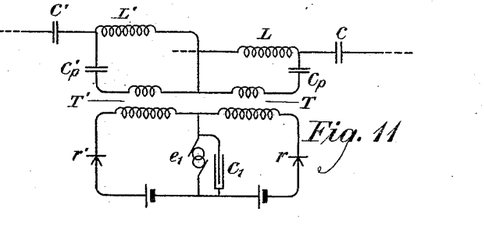

In Fig. 11 the circuits of Fig. 10 are duplicated somewhat as the circuits of Fig. 6 are duplicated in Fig. 8.

Figure 14:
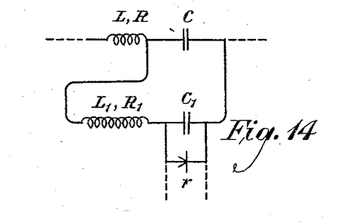
Figs. 14 to 25 illustrate further modifications in the application of the principle of my invention.

There is another method of overcoming the difficulty which may arise from the high resistance of the vacuum tube valve relatively to the impedance of the elements of the resonant circuit branch. This consists in using the valve to shunt one of the tuning elements of an auxiliary resonance branch, the reactances of whose tuning elements are very high, and in placing this auxiliary resonant branch in shunt to one of the tuning elements of the main resonant branch which it is desired to control. Such an arrangement is shown in Fig. 14. When the valve $r$ of Fig. 14 is open-circuited the impedance of the branch $L_1$, $C_1$ is reduced to the negligible resistance $R_1$ and the impedance of the branch L, C will be effectively the reactance $Lw_o$. On the other hand, when the valve $r$ of Fig. 14 reaches its lowest resistance, the effective resistance of the branch L, C is $$R' = R + R'_1 \frac{L^2 w_o^2}{R'^2_1 + x'^2_1 + Lw_o(Lw_o - 2x'_1)} \quad (8)$$

and its effective reactance is:

$$X' = Lw_o \left(1 - \frac{R'^2_1 + x'^2_1 - Lx'w_o}{R'^2_1 + x'^2_1 + Lw_o(Lw_o - 2x'_1)}\right) \quad (9)$$

where $$R'_1 = R_1 + r \frac{L_1^2 w_o^2}{r^2 + L_1^2 w_o^2} \quad (10)$$

and $$X'_1 = \frac{L_1^3 w_o^3}{r^2 + L_1^2 w_o^2} \quad (11)$$

where $r$ is the lowest resistance of the valve $r$. Let $r^2$ be negligible compared to $L_1^2 w_o^2$, so that $$R'_1 = R_1 + r \quad (12)$$

and $$X'_1 = L_1 w_o \quad (13)$$

also let $R_1$ be negligible compared to $r$, and $r_2$ be negligible compared to $L_1^2 w_o^2$. We then have in effect, $R'^2_1$ negligible compared to $x'^2_1$. Then:

$$R' = R + r \frac{L^2/L_1^2}{1 + L^2/L_1^2 - 2L/L_1} + \delta \quad (14)$$

and $$X' = Lw_o \left(1 - \frac{1 - L/L_1}{1 + L^2/L_1^2 - 2L/L_1}\right) + \delta \quad (15)$$

In the foregoing equations 14 and 15 and in certain equations that follow, the character $\delta$ represents a relatively small quantity that may be neglected in the practical use of the equations. It enters because of the approximations mentioned in the text preceding the equations.

Let $L^2/L_1^2$ be negligible compared to unity, then $$R' = R + r \frac{L^2/L_1^2}{1 - 2L/L_1} + \delta \quad (16)$$

$$X' = -Lw_o \frac{L/L_1}{1 - 2L/L_1} + \delta$$

If $L_1$ of Fig. 14 be made sufficiently large compared to L, then $X'$ may be made as small as desired and $R'$ may be made as nearly equal to R as we may require.

Figure 15:
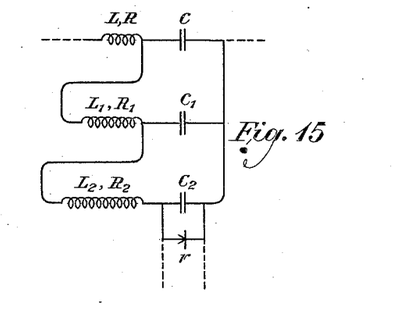

The principle here discussed in connection with Fig. 14 may be extended as shown in Fig. 15. In this diagram $R_1$ and $R_2$ are negligible resistances, $L<L_1<L_2$, while $C_2<C_1<C$. In general it will be sufficient to make $L_2w_0=10r$, $L_1=10L$, $L_2=10L_1$, $L_1w_0=100R_1$ and $L_2w_0=R_2$.

Figure 16:
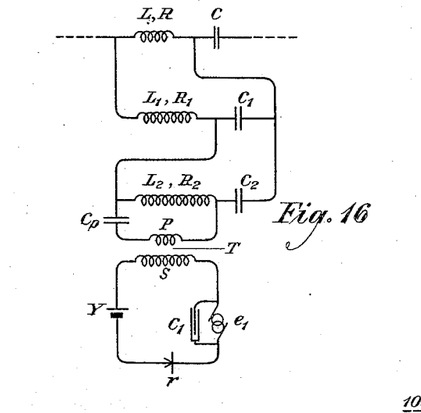
Figure 17:
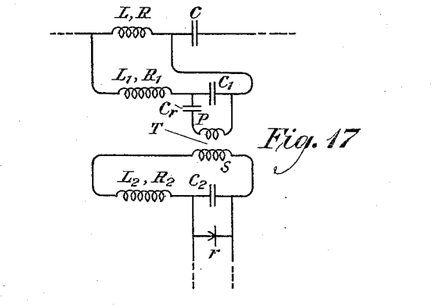

The principles illustrated in Fig. 9 et seq. and in Fig. 14, and discussed in connection therewith may be used in combination as shown in Figs. 16 and 17.

Referring to Fig. 16 as compared with 15, the inductance L is shunted instead of the condenser C. Then instead of placing the valve $r$ directly in association with the coil $L_2$ or condenser $C_2$, the arrangement of Fig. 10 is introduced.

Again, in Fig. 17 the coil L is shunted (instead of the condenser C as in Fig. 14) by a secondary resonant branch $L_1$, $C_1$. Then a tertiary resonant branch $L_2$, $C_2$ is associated through a transformer T, and then the tertiary condenser $C_2$ is shunted by the valve $r$.

In the foregoing disclosure of examples of the practice of my invention, the valve has been employed to "open" and "close" the circuit of a resonant branch comprising an inductance coil in series with a condenser. As will be shown in connection with Fig. 26, this application of my invention may find utility in multiplex telegraphy. For some purposes it may be desirable to employ filters of the recurrent section type instead of mere resonant branches, and I will now disclose a limited number of embodiments of my invention in connection with such filters.

Figure 18:
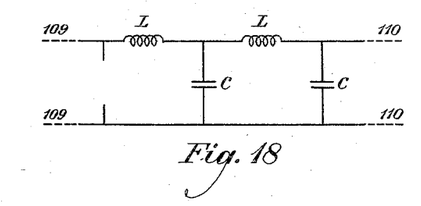

Assume a low pass filter of the well known type shown in Fig. 18. For an electromotive force applied across the terminals 109, current will be transmitted through to the terminals 110 with substantially no attenuation for frequencies below a certain critical frequency, but for frequencies above this critical frequency the currents will be attenuated and will get through to 110 only at greatly reduced intensity.

Figure 19:
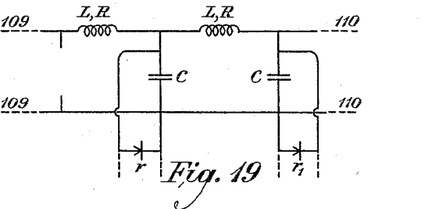

Now let each shunt condenser C of this filter be shunted by a valve combination as shown in Fig. 19 just as the condenser C of Fig. 1 is shunted by such a combination when the switches S are thrown down. It results that for one half-cycle of the low frequency generator $e_1$ (compare Fig. 1) the filter of Fig. 19 operates just the same as the filter Fig. 18, but for the alternate half-cycle of the generator $e_1$ all frequencies are blocked and the filter does not transmit any current at any frequency.

Figure 20:
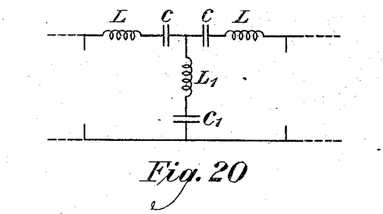
Figure 21:
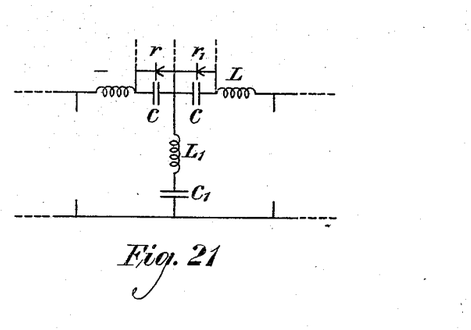

Fig. 20 shows a confluent band filter, one which attenuates currents of frequencies below a certain critical frequency $$f_1 = 1/2\pi\sqrt{CL},$$

passes currents of frequencies between $f_1$ and a higher frequency $$f_2 = \frac{1}{2\pi}\sqrt{\frac{4C+C_1}{4CC_1L_1+CC_1L}},$$

and again attenuates currents of frequencies higher than $f_2$. By shunting the series condensers C by means of valves and associated elements as indicated in Fig. 21 (and with more detail in Fig. 1), the band filter is modified so that during one half-cycle of the low frequency generators associated with the valves $r$ and $r_1$, it operates normally like the filter of Fig. 20; but during the other half-cycle of these low frequency generators, the filter passes all currents of frequencies from zero up to the frequency $$f'_2 = \frac{1}{2\pi}\sqrt{\frac{4}{4C_1L_1+C_1L}}$$

and blocks all higher frequencies.

Figure 22:
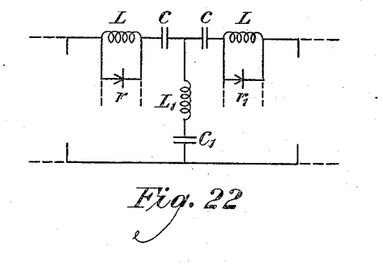

It will be seen that in Fig. 22 the valves are arranged to shunt the series inductances instead of the series condensers (as in Fig. 21). In Fig. 22 the filter operates normally like Fig. 20 for one half cycle on the low frequency generators associated with the valves, but for the other half cycle the filter of Fig. 22 blocks all frequencies from zero up to a frequency $$f = \frac{1}{4\pi}\sqrt{\frac{4C+C_1}{CC_1L_1}}$$

and passes all frequencies above that limit.

Figure 23:
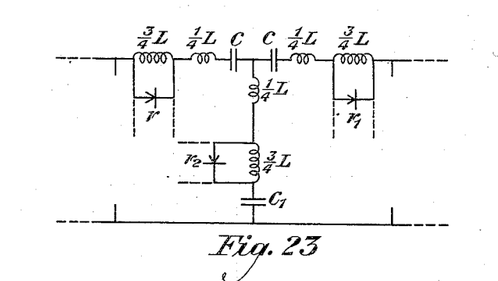

Fig. 23 illustrates the effect of periodically shortcircuiting certain parts of reactance elements of a filter. It will be noted that the valves shown in Fig. 23 are placed in shunt respectively to parts of the inductance coils L and $L_1$. During one half cycle of the low frequency generators associated with the valves of Fig. 23, the system operates like that of Fig. 20 as a regular band filter. During the other half cycle the pass band is shifted to a range whose critical frequencies are respectively double those of the normal range.

Figure 24:
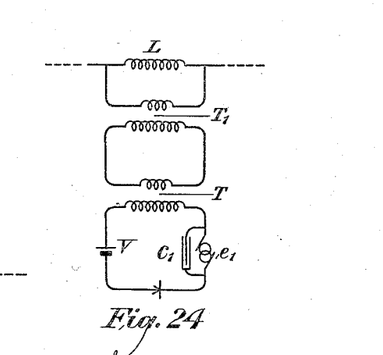

Fig. 24 illustrates how transformers may be used in tandem, so to speak, to get an increased ratio as compared with the single transformer of Fig. 10. This may be desirable in cases when a very great stepping down becomes necessary on account of the relatively high resistance of the valves employed.

Figure 25:
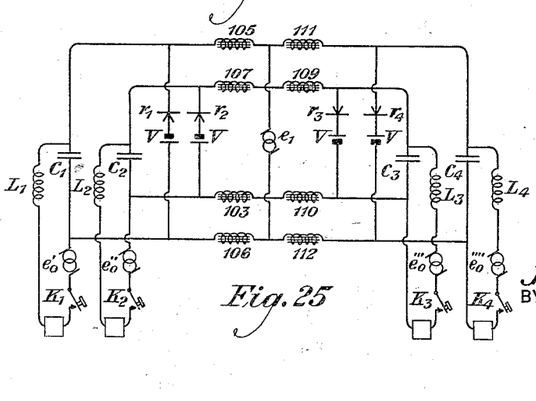

Fig. 25 shows how a plurality of valves of which four are shown may be associated with a single low frequency controlling source $e_1$. Between the generator of the controlling source $e_1$ and the valve associated with each circuit, impedance coils 105 and 106, 107 and 108, 109 and 110, and 111 and 112 are connected. These impedance coils present little impedance to the low frequency currents from the generator $e_1$, but at the high frequency of the signaling generators $e'_0$, $e''_0$, $e'''_0$ and $e'^v_0$, their impedances rise to sufficiently high values to prevent currents from any one signaling circuit from flowing in any other circuit. To equalize the load on the controlling generator $e_1$, valves $r_1$ and $r_2$ are so connected to allow current to flow while valves $r_3$ and $r_4$ are blocking the flow of current.

Figure 26:
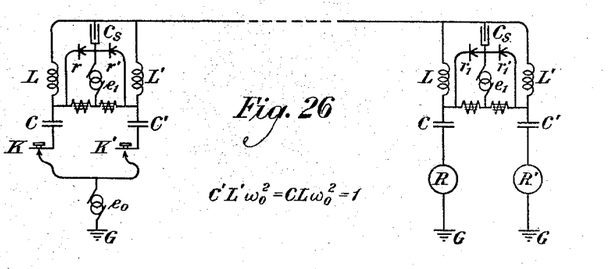
Figs. 26 and 27 are diagrams showing how the invention may be employed in the practice of multiplex signaling.

As an application of my improved commutators for multiplex transmission, I have shown a diplex telegraph system in Fig. 26. The single carrier current of frequency determined by the generator $e_0$ is applied to the line through the parallel resonant branches L, C and L', C' controlled respectively by the keys K and K'. The coils L and L' are shunted respectively by the valves $r$ and $r'$ and the arrangement is such that the high frequency currents from $e_0$ are passed through C, L and blocked through C', L' during one half-cycle of the low frequency generator $e_1$ and blocked through C, L and passed through C', L' during the other half-cycle of $e_1$. Thus the key K gets the line for one half-cycle and the key K' gets the line for the alternate half-cycle. While the frequency of the generator $e_1$ is much lower than that of the generator $e_0$, it is high relatively to the period of opening or closing either key K or K'.

At the receiving end the generator $e_1$ will be synchronized with $e_0$, but since measures for accomplishing this are old and well known in the art I do not show them here. Also, the generator $e_1$ at the receiving end should lag in phase by a suitable time interval corresponding to the time of transmission over the line.

Figure 27:
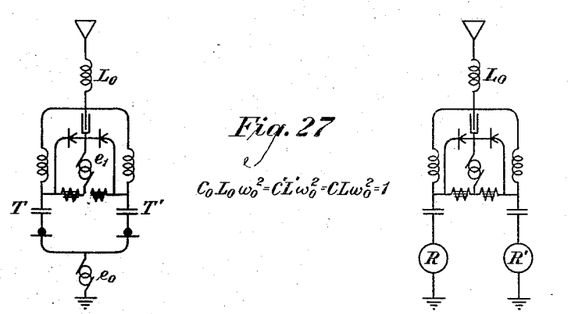

Fig. 27 illustrates a diplex radio telephone system. The apparatus corresponds so closely to that of Fig. 26 that it is thought its structure and mode of operation will be apparent without extended discussion at this point. The carrier current of frequency determined by the generator $e_0$ is modulated by the transmitters T and T' (instead of by the keys K and K' as in Fig. 26).

Figure 28:
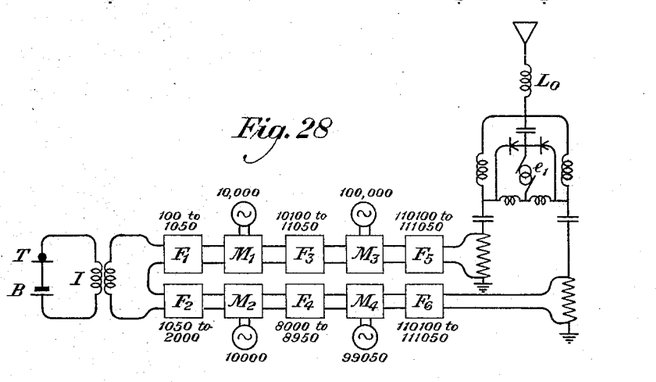
Fig. 28 shows how the invention may be employed to narrow the frequency range for a single message channel.

In Fig. 28 I have illustrated a system for economizing frequency range in voice transmission. As is well known, ordinary conversation involves frequencies of from 100 to 2,000 cycles per second, and this range may be deemed essential for intelligibility.

By means of the transmitter T the current due to the battery B is caused to fluctuate, and this fluctuating current through the primary of the transformer I develops a corresponding alternating current in the secondary circuit. This output current from the secondary is a composite of currents of various frequencies of which those within the range from 100 to 2,000 cycles per second are essential. The filter $F_1$ passes all frequencies from 100 to 1,050, while the filter $F_2$ passes all frequencies from 1,050 to 2,000. The output current passed by the filter $F_1$, whose components range in frequency from 100 to 1,050, is applied in the modulator $M_1$ to modulate a current of the basic frequency of 10,000 cycles per second. Accordingly, the output from the modulator $M_1$ comprises the side bands of respective frequency range from 8,950 to 9,900 and 10,000 to 11,050. These output currents go to the filter $F_3$ which blocks the lower side band and passes the upper side band of from 1,100 to 11,050. The basic frequency for the modulator $M_3$ is 100,000 cycles per second and this is modulated by the side band of frequency range from 10,100 to 11,050 so that the resulting side bands from the modulator $M_3$ have the frequency ranges respectively from 88,950 to 89,900 and 110,100 to 111,050. Again, let the filter $F_5$ block the lower of these two side bands and pass the currents of frequency range from 110,100 to 111,050.

The filter $F_2$ passes the frequency range 1,050 to 2,000 which is applied in the modulator $M_2$ to modulate the carrier frequency 10,000. Of the resulting side bands the filter $F_4$ passes the lower of range 8,000 to 8,950. This is applied in the modulator $M_4$ to modulate the carrier frequency 99,050, and of the resulting side bands the filter $F_6$ passes the upper, of frequency range from 110,100 to 111,050. Thus it will be seen that each filter $F_5$ and $F_6$ passes the same frequency range, namely, from 110,100 to 111,050, a frequency width of 950 cycles, only half the frequency width of the essential voice range from 100 to 2,000.

Comparing Fig. 28 with Fig. 27 it will be seen that the apparatus at the right hand part of Fig. 28 has been obtained from Fig. 27 by omitting the generator $e_0$ of Fig. 27 and connecting the output circuits of the filters $F_5$ and $F_6$ to replace the transmitters T and T' of Fig. 27.

It will at once be seen that the system of Fig. 28 transmits the essential voice range on a carrier frequency range of approximately half the frequency width of the essential voice range. With the transmitting system of Fig. 28 the receiving system of Fig. 27 may be employed with the understanding that the two receivers R and R' are combined so that one person hears the sounds emitted by both of them in the proper frequency relation.

Figure 28A:
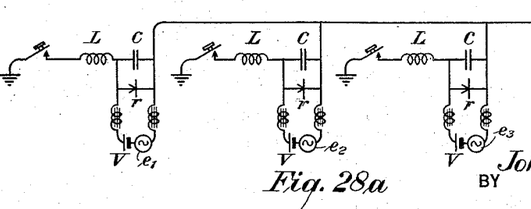
Fig. 28a illustrates my invention in connection with a three channel multiplex system.

In the foregoing examples of practice according to my invention the commutator connects two branch circuits alternately to a single circuit. The principle of the invention may readily be employed to connect a larger number of branch circuits in cyclic order to a single circuit. This is illustrated in Fig. 28a which shows a commutator by which each of three branch circuits is connected for a third of a cycle to a single circuit. The generators $e_1$, $e_2$ and $e_3$ are of the same frequency and a third of a cycle apart in phase, as shown by the full line curves of Fig. 30. The direct current sources are so directed and of such magnitude that the axis of abscissæ for the electromotive forces on the valves $r$, is brought down from O to O'. Thus each valve $r$ passes current from $e_1$ or $e_2$ or $e_3$ for two thirds of a cycle and blocks it for one third of a cycle, and accordingly, each resonant branch L, C passes current for one third of a cycle, and blocks it for two thirds of a cycle.

Figure 29:
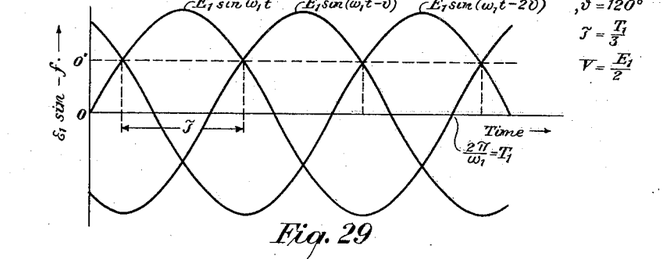
Figs. 29 to 32 are diagrams illustrating phase relations that will be referred to in this connection.
Figure 30:
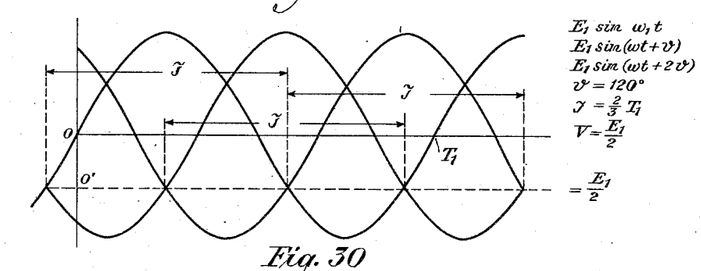

When two step valves are employed, such as those of Fig. 14, the arrangement must be as in Fig. 29; that is the sources V must be reversed as compared with Fig. 28a and Fig. 30.

When three step valves are employed as in Fig. 15, or any odd number of steps, the diagram of Fig. 30 is applicable. For any even number of steps the diagram of Fig. 29 applies.

Figure 31:
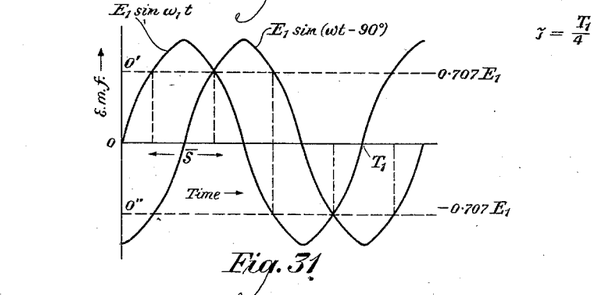
Figure 32:
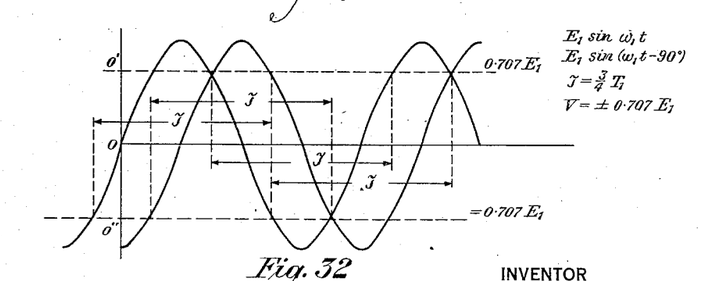

For quadruplex operation, each transmission period should be a quarter cycle. In this case only two control sources are required, $E_1 \sin w_1 t$ and $-E_1 \cos w_1 t$. These may take the place of $e_1$ in each of two systems like that of Fig. 8 or Fig. 11, the phase relations being shown in Fig. 32. In case two (or four) step valve circuits are employed, the proper diagram is given in Fig. 31 instead of Fig. 32.

I claim:

1. An interrupter for an alternating current of a certain frequency comprising a branch circuit resonant to that frequency, a valve shunting an element of said branch, and a local source of electromotive force associated with said valve.

2. The method of commutating a relatively high frequency alternating current through a resonant branch circuit having a valve in shunt to an element thereof which consists in applying a relatively low frequency local electromotive force to the valve and thereby blocking the high frequency current for part of each cycle of the low frequency force and passing it for another part thereof.

3. In combination, an inductance coil and a condenser in series, a shunt network around one of these elements, a valve comprised in said network, and means to vary the resistance of the valve cyclically and thereby to produce a corresponding wide change in the impedance at the resonant frequency across the terminals of said inductance and condenser in series.

4. In combination, an inductance coil and a condenser in series, a shunt network around one of these elements, a two electrode thermionic vacuum tube comprised in said network, an alternating current generator in shunt to said tube, said generator being of low frequency compared to the resonant frequency of said coil and condenser, an inductance in series with said generator and having high impedance to said resonant frequency but low to said generator frequency, and a direct current source also in series with said generator.

5. In combination, a plurality of resonant branch circuits of the same natural frequency connected in multiple to a single circuit, and means to make the connections effective at that frequency for one branch and ineffective for the others in cyclic order, said means comprising networks each in shunt to one element of a respective branch, each network comprising a valve and a local source of direct current and a local source of alternating current applied to said valve, said alternating current sources being at different phases but on the same frequency, and said frequency being low compared to said natural frequency.

6. Means to interrupt regularly a current of a certain frequency through a coil and condenser in series resonant to that frequency, which comprises a valve in shunt to one of said elements and a local alternating current source applied to said valve, said source being of relatively low frequency.

In testimony whereof, I have signed my name to this specification this 11th day of December 1929.

JOHN STONE STONE.